United States Patent [19]

Miller et al.

[11] Patent Number: 5,591,293
[45] Date of Patent: Jan. 7, 1997

[54] PROCESS FOR MANUFACTURING DRIP IRRIGATION SYSTEMS USING PLASTIC LAMINATION/EXTRUSION TECHNIQUES

[75] Inventors: David B. Miller, Fresno; John M. Langa, Alpine; Rodney Ruskin, San Francisco, all of Calif.

[73] Assignee: Agrifim Irrigation Internaional N.V., Netherlands Antilles

[21] Appl. No.: 339,593

[22] Filed: Nov. 14, 1994

[51] Int. Cl.$^6$ .............................. B29C 47/02; B05B 15/00
[52] U.S. Cl. .................. 156/244.13; 156/203; 156/218; 156/244.22; 156/244.27; 239/542; 264/171.12
[58] Field of Search ........................ 239/542, 547; 156/244.13, 244.19, 244.22, 244.24, 244.27, 203, 218; 264/209.3, 171.12, 172.1

[56] References Cited

U.S. PATENT DOCUMENTS

| | | | |
|---|---|---|---|
| 3,896,999 | 7/1975 | Barragan | 239/542 |
| 4,060,200 | 11/1977 | Mehoudar | 239/542 |
| 4,285,472 | 8/1981 | Okada | 239/542 |
| 4,307,841 | 12/1981 | Mehoudar | 239/542 |
| 4,417,936 | 11/1983 | Gaffney | 156/244.13 |
| 4,474,330 | 10/1984 | Langa | 239/450 |
| 4,541,569 | 9/1985 | Langa | 239/450 |
| 4,880,167 | 11/1989 | Langa et al. | 239/542 |
| 5,052,625 | 10/1991 | Ruskin | 239/542 |
| 5,192,027 | 3/1993 | Delmer | 239/542 |
| 5,252,162 | 10/1993 | Delmer | 156/227 |
| 5,310,438 | 5/1994 | Ruskin | 156/243 |

*Primary Examiner*—Daniel Stemmer
*Attorney, Agent, or Firm*—Christie, Parker & Hale LLP

[57] ABSTRACT

A process for making low cost drip irrigation lines comprises molding a drip emitter having an elongated labyrinthine channel formed in the depth of the emitter body. Emitters of other configurations also can be used in the process. A plastic film is extruded and passed through a film die with an air injection tube at one end forming a plastic film bubble. At the bottom of the extruded plastic film bubble a pair of pressure rolls join opposite faces of the bubble to form a continuous unitary extruded plastic film sheet. The emitters are moved in series toward the nip of the pressure rolls and are inserted in sequence with their labyrinthine faces facing toward the hot bubble. The emitters are bonded to the extruded film sheet using the heat of extrusion, and the external sheet forms one face of the labyrinthine channel through each emitter. After laminating the emitter to the extruded film, an exit hole is formed through the film to each emitter and the film is then wrapped and bead sealed to form a continuous flexible drip irrigation tube with the emitters spaced apart along the inside of the tube. The process can be used for making multiple drip irrigation lines in parallel along a single extruded plastic film sheet.

12 Claims, 4 Drawing Sheets

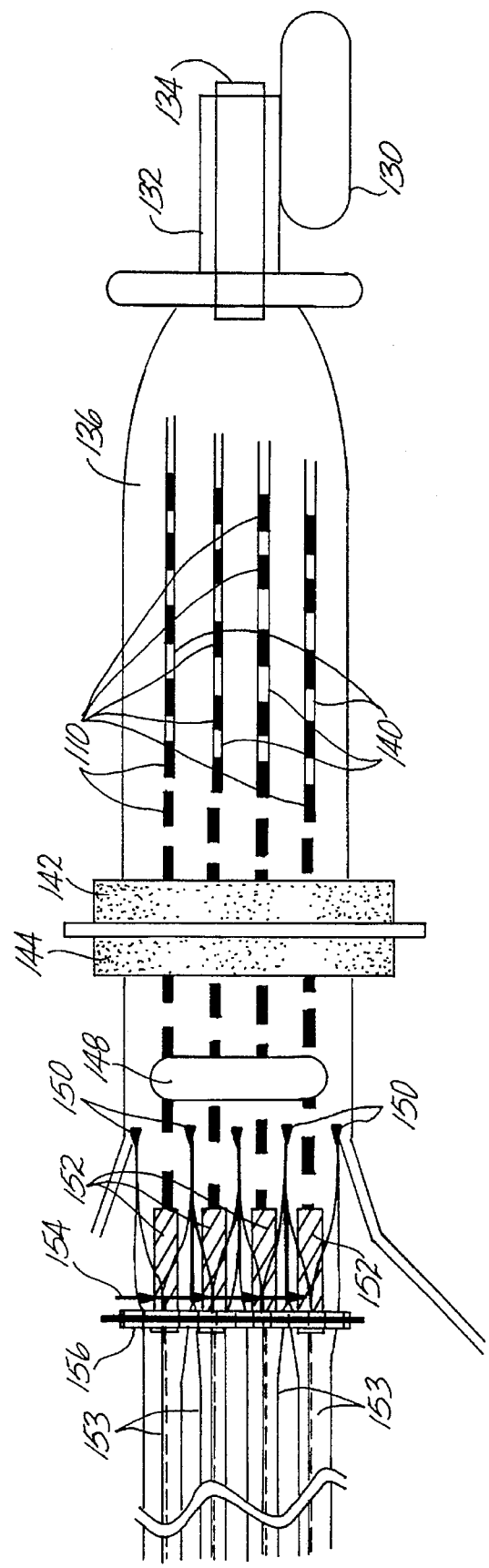

PROCESS FOR MANUFACTURING DRIP IRRIGATION SYSTEMS USING PLASTIC LAMINATION/EXTRUSION TECHNIQUES

FIELD OF THE INVENTION

This invention relates to drip irrigation, and more particularly, to a method for making drip irrigation lines in which emitters are bonded to a drip irrigation supply tube by plastic film extrusion, film blowing and lamination techniques. The invention is particularly useful in manufacturing low cost drip irrigation lines at high production speeds.

BACKGROUND OF THE INVENTION

Drip irrigation systems usually include a continuous irrigation water supply line with emitter-type drippers installed along the line, usually at regular intervals. (The terms "emitter" and "dripper" are used interchangeably to refer to the pressure-reducing element of the system.) Irrigation water flows through the supply line under pressure, and a small amount of water continuously drips out at the intervals where the drippers are located. Drip irrigation has proved to be highly successful in producing greater growth of vegetation with the same amount of water, when compared with conventional irrigation techniques.

A number of different drip irrigation systems have been used in the past. They vary from the cheapest and simplest systems, namely, a hole in the wall of a water supply line, to expensive and complex multi-component dripper units.

Perhaps the most practical of the prior drip irrigation systems involves use of separate drip emitters or drippers installed in or on the supply line. The dripper taps off a portion of the water flowing in the water supply line and passes the water through a labyrinth or other meandering or circuitous path that produces a large pressure drop in the water and discharges it at a uniform drip rate. Generally, such pressure-reducing labyrinthine drippers are successful because they use a large enough hole in the supply pipe and a wide enough passage through the labyrinth to avoid clogging in most cases, while they also operate at reasonably high line pressures.

The present invention is directed to the problem of developing an economic drip irrigation system for low value crops where it is essential to reduce the capital costs for a precise system to a level lower than that achieved by drip irrigation systems presently available.

There are low cost drip irrigation systems presently available that are made from thin plastic film, as thin as 0.004 inch in wall thickness. These products are not easy to use because of the low strength of the film, and they commonly are used for one growing season only and then thrown away. There are similar drip irrigation systems with wall thicknesses up to about 0.02 inch, and if buried, they will last for many crops, but these systems have problems with root intrusion. In addition, the management to operate these systems for several crops is very difficult, and thus excludes most growers.

U.S. Pat. No. 5,310,438 to Ruskin discloses a method for making low cost drip irrigation systems having an extended life beyond the growing season of one crop. The drip irrigation lines can be used effectively for multiple growing seasons or multiple crops in sequence over an extended period of time. The drip irrigation system disclosed in the '438 patent also carries herbicides such as trifluralin to keep invasive roots out of the dripper system.

The present invention is based on a recognition of disadvantages with the process disclosed in the '438 patent. According to the present invention, drip irrigation lines are comparatively easier to manufacture, particularly as a result of a method used for feeding a sequence of drippers to an extruded plastic film to which the drippers are bonded. As a result, production speed is greatly increased, particularly with the simultaneous production of multiple drip irrigation lines. In addition, the film wall strength adjacent each emitter is improved compared to the '438 process. The process of this invention also eliminates the additional steps of punching inlet holes into the drippers, which was characteristic of the '438 process. Further, the finished drip irrigation lines produced by the present method can easily incorporate multiple small holes into each dripper to act as a filter, which was absent from the '438 process.

SUMMARY OF THE INVENTION

Briefly, one embodiment of the invention includes a method for bonding a drip emitter to a wall of a drip irrigation conduit by plastic film blowing and lamination techniques. The emitter can be any type of drip irrigation emitter capable of being bonded to an extruded plastic film sheet. The emitter is preferably bonded by lamination to an extruded plastic film sheet along a continuous length of the film as it exits the extruder. In one embodiment, the process includes forming a plastic film bubble from the extruded film sheet. The opposite faces of the plastic film bubble are joined by a pair of pressure rolls downstream from the air-injection end of the bubble. The emitter is inserted into the nip of the pressure rolls for pressure-laminating the emitter body to the outside of the plastic film. This joins the opposite wall portions of the plastic film bubble to form a unitary wall structure with the emitter bonded to the exterior of the unitary film. The emitter is bonded to the film by the heat of extrusion. In one embodiment, the emitter is fed to the nip of the pressure rolls with a labyrinthine face of the emitter facing toward the hot plastic film bubble. As the emitters are fed to the nip of the pressure rolls in sequence, the emitters are laminated under pressure with the heat of extrusion bonding the labyrinthine faces of the emitters to the continuous unitary plastic film sheet. After the laminating step, an outlet opening is formed through the wall of the film and into the labyrinthine passage in the emitter. The plastic film with the series of bonded emitters is then formed into an elongated, flexible tubular drip irrigation conduit, with the emitters spaced apart along the inside of the conduit. The emitter inlets are on the inside of the conduit so the inlet receives water under pressure travelling in the conduit, passes it through the labyrinthine passage to reduce its pressure, and discharges the water through the outlet opening to the exterior of the conduit at a drip rate. Alternatively, the emitters can be bonded to the outside of the tubular conduit formed from the extruded plastic film.

By extruding the film using conventional film blowing equipment and lamination techniques, optimal film strength can be achieved which can extend the life of the drip irrigation lines during use with multiple crops and multiple growing seasons. The method of manufacture for either single or multiple lines from one extruder is substantially faster than the method disclosed in the '438 patent. The wall strength of the irrigation lines in the vicinity of the emitters also is strengthened compared to the '438 process in which the emitters were embedded in the double wall outer face of the plastic film bubble. Because the entry hole into each emitter can be molded into the emitter, only one exit hole

3 needs to be punched into the tube during the manufacturing process. Each emitter therefore can incorporate multiple small inlet holes to act as a filter, which was absent from the '438 process.

These and other aspects of the invention will be more fully understood by referring to the following detailed description and the accompanying drawings.

DETAILED DESCRIPTION OF THE DRAWINGS

FIG. 5 is a schematic view illustrating an embodiment of a process for simultaneously manufacturing multiple drip irrigation lines in parallel on a single extruded film sheet.

DETAILED DESCRIPTION

Figure 1:
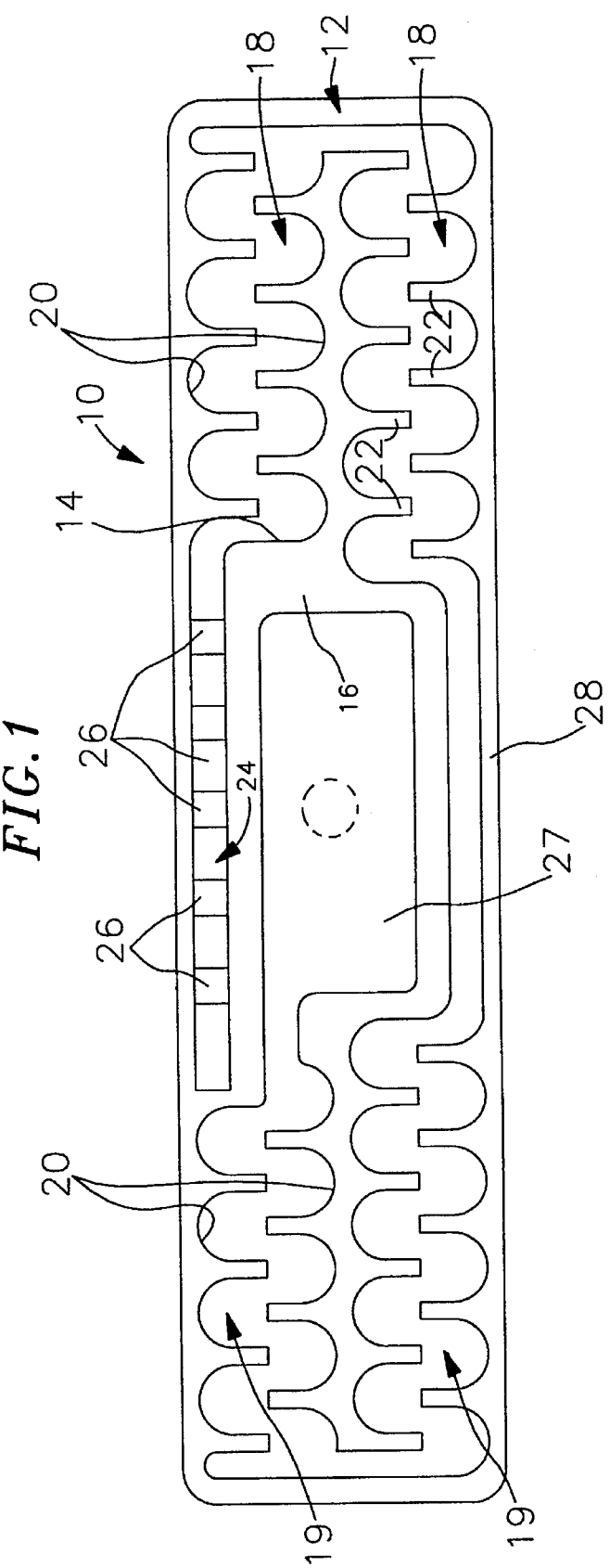
FIG. 1 is an elevation view showing an example of a molded plastic dripper used in the process of this invention.

FIG. 1 illustrates one embodiment of a drip irrigation emitter 10 that can be used in the process of this invention. The emitter 10 is a molded plastic emitter of the turbulent flow variety which is preferably manufactured by injection molding techniques. Other types of emitters which can also be used with the invention are pressure-compensating emitters and vortex type emitters, for example. The pressure compensating emitter disclosed in Ruskin in U.S. Pat. No. 5,052,625 is an example of another type of emitter that can be used with this invention. The emitter 10, also referred to herein as a dripper, has a molded plastic body 12. A flow-restricting labyrinthine channel 14 is molded into the depth of a first flat face 16 of the dripper body. The dripper body is long and narrow and has a flat second face extending parallel to and opposing the first flat face 16. The labyrinthine channel 14 thus faces toward the first face and away from the second face of the emitter. The labyrinthine channel has channel sections which extend along the length of the dripper body, parallel to the long dimension of the dripper. There are a first pair of parallel channel sections 18 at one end of the emitter and a second pair of parallel channel sections 19 at the other end. The first pair of channel sections 18 receive water from an inlet end of the emitter and the water passes to the opposite end of the emitter when it passes through the second pair of channel sections 19 and then to a discharge region in the center of the emitter. Each channel section has opposed side walls 20 spaced apart narrowly and parallel to one another, with elongated uniformly spaced apart ribs or baffles 22 that extend into the channel from both of the side walls of the channel outer boundary. The ribs are interleaved along the length of each channel section in the well-known fashion and are generally parallel to one another and generally perpendicular to the long side boundaries of the channel. The ribs thus form a continuous meandering or labyrinthine channel that constantly reverses the direction from one end of each channel section to the other. The tops of the ribs are continuous with the elevation of the flat face 16 that spans the molded dripper body. An inlet region 24 is formed as a recess at one end of the labyrinthine channel. The inlet region includes a series of spaced apart molded inlet holes 26 extending through the depth of the emitter body and opening into the inlet region 24. The inlet holes 26 act as a filter for water passing from the inside of the dripper conduit (described below) to the labyrinth 14. The width of the inlet holes is less than the minimum width of the labyrinthine channel which filters the water entering the labyrinthine. A water discharge region 27 in the center of the emitter is recessed in the face 16 of the dripper at the end of the labyrinth. The molded dripper unit also has an outer peripheral edge region 28 that extends continuously around the perimeter of the emitter.

The emitter is preferably injection molded from polyethylene, or from a polymer containing a principal amount of polyethylene, or other low cost moldable polymer. The herbicide trifluralin can be dispersed uniformly throughout the resin, and the advantages and techniques for dispersing the herbicide in the resin are described in more detail in U.S. Pat. Nos. 5,116,414 to Burton and 5,310,438 to Ruskin, which are incorporated herein by this reference.

Figure 2:
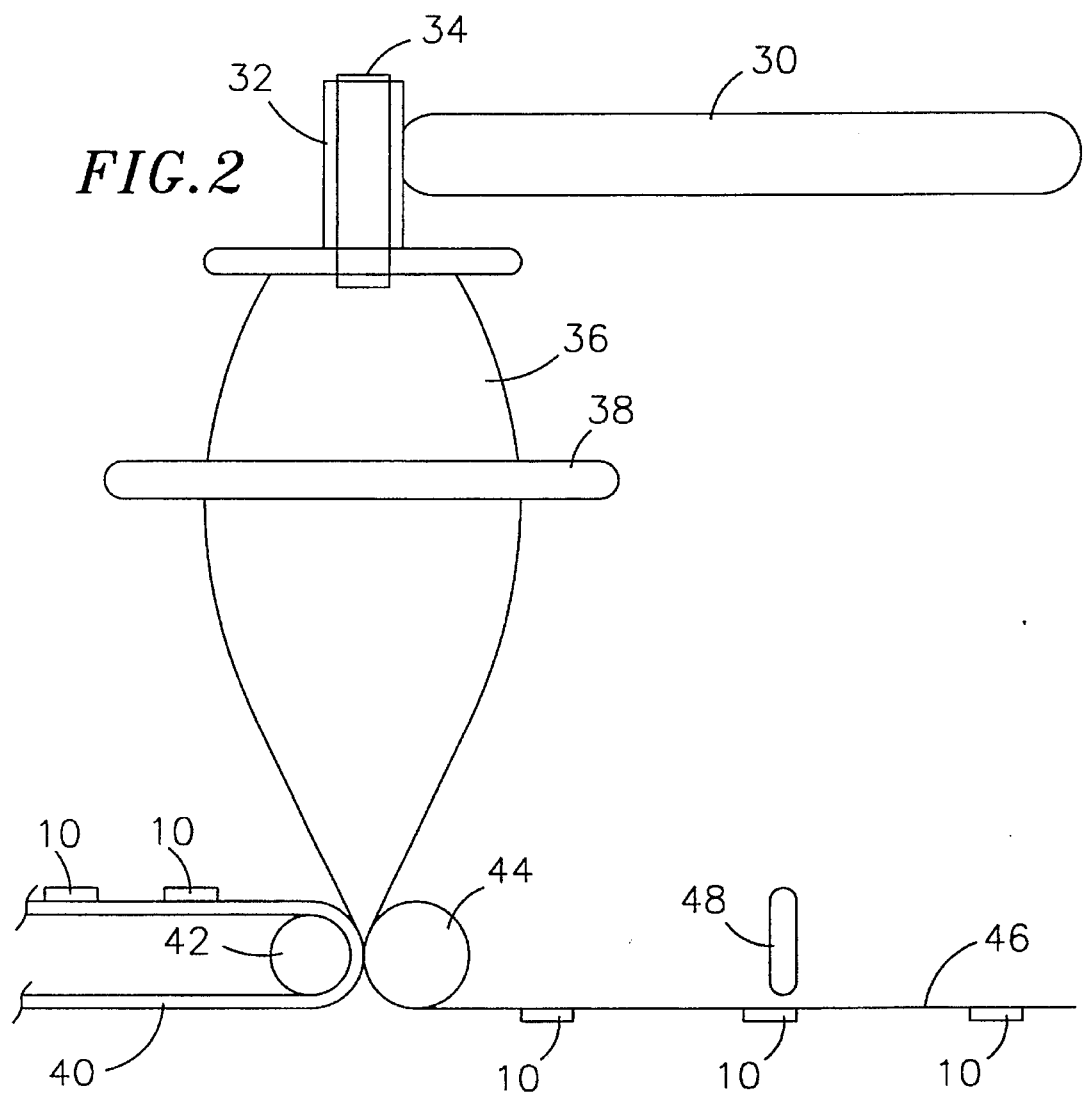
FIG. 2 is a schematic view illustrating a plastic film extrusion, film blowing and lamination process for bonding a series of the drippers to the exterior of an extruded two-ply film.

FIG. 2 illustrates one embodiment of an extrusion and laminating process for bonding the dripper units 10 to the wall of a plastic film conduit. The processing step includes an extruder 30 for forming a thin sheet of extruded plastic around an extruder die 32. An air feed tube 34 extends through the extruder die, and conventional film-blowing techniques are used for extruding the film downwards and forming an extruded plastic film bubble 36 below the die. An air cooling ring 38 extends around the outer circumference of the extruded plastic bubble 36. A dripper feed conveyor 40 carries a supply of the molded dripper units 10 which are spaced apart in series along the conveyor. The dripper feed conveyor comprises an endless belt conveyor which inserts each dripper unit a short distance above a pair of pressure rolls 42 and 44 at the bottom of the plastic film bubble 36. The drippers are preferably stationed between parallel tracks on the conveyor belt to position them securely against the film as the conveyor belt wraps around the pressure roll 42. The drippers travelling on the belt are freely and independently carried by the belt to be transferred separately and independently from the belt to the nip of the pressure rolls. The pressure rolls join the opposite faces of the film bubble. Roll 42 is a rubber laminating roll and roll 44 is a steel roll. The drippers are fed to the nip of the pressure rolls with the labyrinthine channel face 16 of the drippers facing toward the hot bubble when pressed against the film by the rollers. The drippers are fed to the nip of the laminating rollers while the surface of the film is still hot, in order to press the drippers securely against the adjacent layers of film, using the heat of extrusion for bonding the extruded film layers to a common face of the drippers. The pressure applied to the heated walls of the bubble also joins the extruded film as a unitary wall structure. The rubber laminating roll compresses to allow the drippers to pass between the rollers. The air cooling ring 38 cools the outside of the film and stabilizes the bubble when extruding heavy wall thicknesses, but it can be omitted in some production operations. The distance between the nip and the die is adjustable and can be on the order of twelve inches. Following the lamination step at the nip of the pressure rollers, a continuous length 46 of the unitary plastic film sheet travels away from the laminating station with, the emitters 10 bonded to the outside of the film.

As an alternative, other transport means can be used to deliver the drippers freely and independently to the nip of the pressure rolls for bonding them independently in sequence to the film. One such alternative transport system is an air injection system for positioning each dripper independently against the film at the nip of the rolls.

In one embodiment, the extruded plastic film bubble is expanded to a circumference of about two inches, i.e., about 0.637 inch in outside diameter. This technique of blowing the film and laminating the layers produces the optimal strength of film by weight. This is because a balanced orientation of the film is obtained by the blow up ratio across the width versus the speed of draw-down in length. That is, the film is bi-axially oriented in the sense that the extrusion step initially creates axial orientation of the film, and the subsequent air expansion of the bubble produces a sideways orientation of the film. This produces a good combination of tensile strength and burst strength (hoop strength) in the film.

Figure 3:
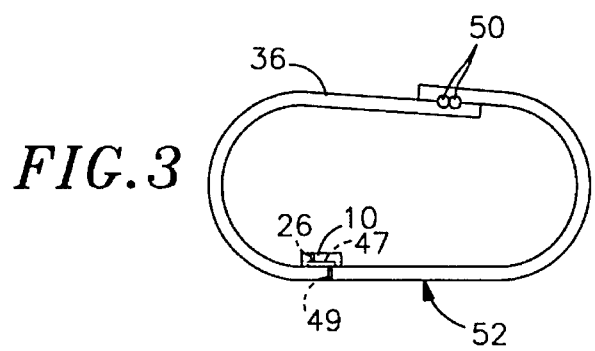
FIG. 3 is a cross-sectional view showing the extruded film wrapped as a tube and with an extrusion bead seal and with the emitter on the inside of the tube.

FIG. 3 illustrates the cross-sectional construction of the dripper units 10 bonded to the inside of the unitary extruded plastic film structure which has been formed into a tubular conduit. Each dripper 10 is sealed to the extruded plastic film structure so as to form a sealed labyrinthine dripper passage through the length of the dripper unit. The extruded film is bonded to the first face 16 of the emitter along with the tops of the ribs 22 to form a completely sealed labyrinthine passage 47, which causes water entering one end and to travel in a meandering or circuitous path at a reduced drip rate. The extruded film layer produces a double wall adjacent the face 18 of each dripper. The molded inlet holes 26 are shown facing toward the interior of the tubular conduit.

Referring again to FIG. 2, following the dripper laminating step, exit holes are punched from the outside to form an outlet passage from each dripper unit. Preferably, laser drilling is used, although mechanical punching or drilling also can be used. FIG. 2 illustrates a laser hole punch 48. FIGS. 1 and 3 illustrate the location of an exit hole 49 in the face of the film that overlies the dripper.

Downstream from the film extrusion process, the film 46 containing the bonded drippers is rolled over a mandrel of about 0.60 inch in diameter to produce an overlap of about 0.125 inch along the length of the film. As shown in FIG. 3, a hot bead seal is extruded into the overlap to form a pair of continuous extrusion bead seals 50 along the length of the conduit 52 formed by the tube wrapping and welding step. The film is wrapped so the drippers are preferably located along the inside of the tubular conduit. The resulting conduit is then pressed flat and rolled up. Alternatively, the film can be wrapped so the drippers (such as a pressure-compensating dripper) are on the outside of the conduit.

Figure 4:
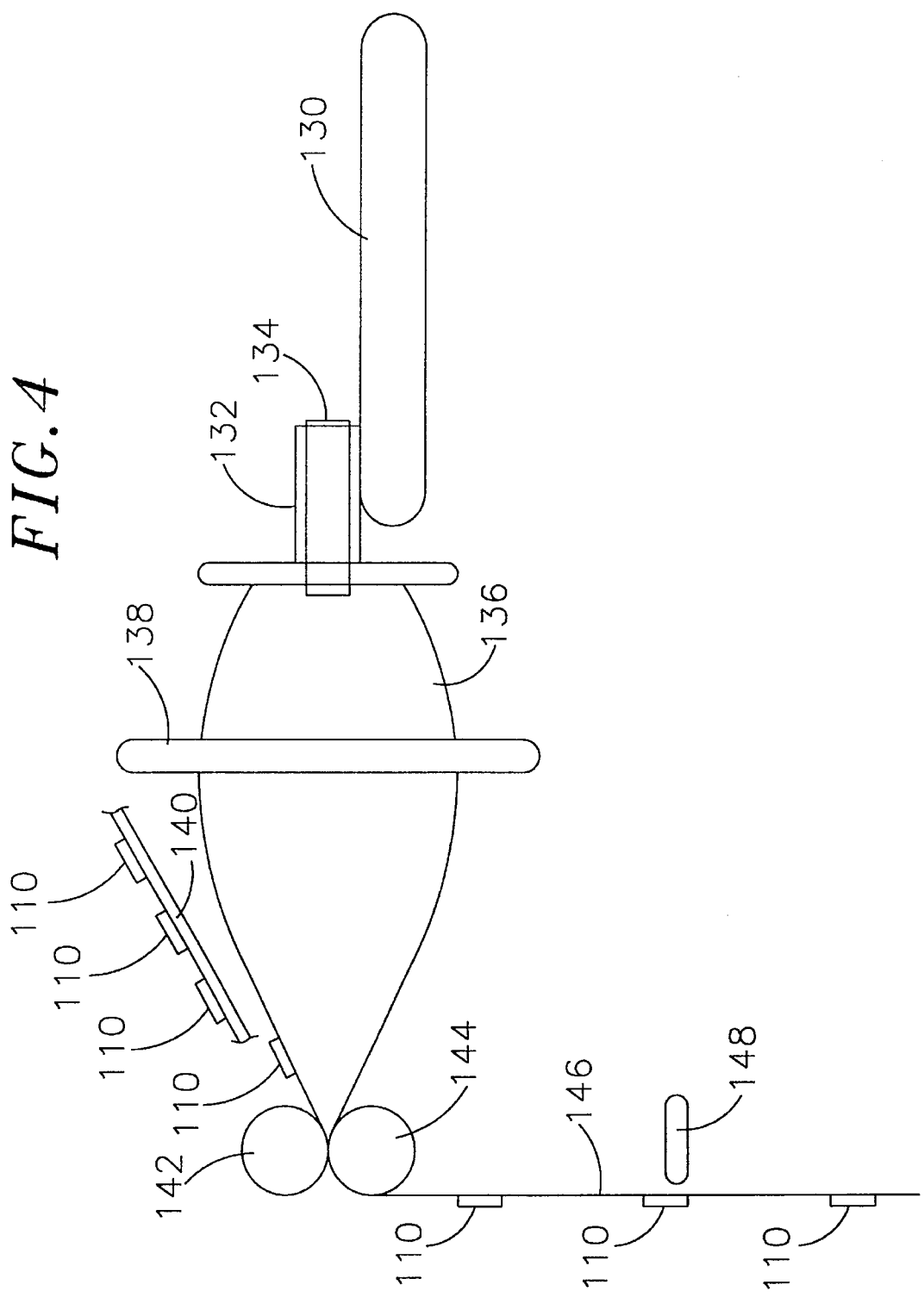
FIG. 4 is a schematic view illustrating an alternative embodiment of the process shown in FIG. 2.

FIG. 4 illustrates an alternative method for inserting dripper units into the nip of the pressure rolls for bonding the drippers to the exterior of the bi-axially oriented extruded plastic film. In this embodiment, a horizontal extruder 130 forms a thin sheet of extruded plastic around a horizontally extending extruder die 132. An air-feed tube 134 extends through the extruder die to form an extruded plastic film bubble 136 in the manner described previously. This embodiment also includes an air-cooling ring 138 extending around the exterior of the extruded plastic bubble 136. The remote end of the plastic film bubble passes between the pressure rolls 142 and 144 which are vertically aligned, and an endless conveyor belt 140 inserts dripper units 110 sequentially onto an upper portion of the film bubble immediately in front of the upper pressure roll 142. As the pressure rolls join the opposite faces of the film bubble, they also carry the drippers in series to the nip of the pressure rolls. The labyrinthine channel faces of the drippers face toward the hot bubble and the drippers are pressed against the film by the pressure of the rollers. As with the previously described method, the drippers are applied under pressure while the plastic film is still hot to use the heat of extrusion for heat-bonding the drippers to the unitary wall structure of the extruded film.

A continuous length 146 of the bi-axially oriented extruded plastic film carries the series of bonded dripper units 110 away from the pressure rolls, and a laser hole punch punches exit holes in the plastic film and into the interior of each dripper unit. The resulting film is then rolled on a mandrel, and a hot bead seal is then extruded into the overlap to form a tubular flexible extruded plastic conduit with the dripper units in series bonded to the inside of the tube.

FIG. 5 illustrates a method for simultaneously forming multiple drip irrigation lines in parallel on a single bi-axially oriented extruded film sheet. This process can be carried out continuously at high production speeds. The process illustrated in FIG. 5 shows the "horizontal" extrusion process described in FIG. 4. In one embodiment in which there are four adjacent parallel drip irrigation lines being formed simultaneously, the process includes four side by side endless conveyor belts 140, each of which carriers a series of axially spaced apart emitter units 110 to the nip of the rolls 142,144. The conveyors are shown delivering the emitter units simultaneously but offset with a time delay across the width of the film sheet so that each pressure roll pressure laminates one dripper at a time to the film sheet 136. Other sequences of operation also can be used. The end of each conveyer belt 140 is spaced upstream from the pressure rolls 142, 144 so that the dipper units are transferred to the surface of the hot bubble, a short distance before the emitters travel into the nip of the pressure rolls.

Following the lamination step, the bonded drippers pass to the hole punch 148 for forming the exit holes in the drippers across the width of the film sheet. The film then passes to a series of slitters 150 spaced apart uniformly across the width of the film for cutting the film into four separate parallel lengths, with a given row of drippers spaced apart axially along the center of each length of film. The separate lengths of film then pass to corresponding folding mandrels 152 for forming each length of film into a corresponding tube 153. Extrusion bead seals at 154 supported by a continuous roll 156 form the continuous lengthwise seals along each tubular conduit. The corresponding lengths of tubular drip irrigation conduits with emitters on the inside are then flattened and passed to four separate winders for winding each length of film into a roll. This process can be carried out continuously at high speeds and can produce 24 emitters per second in four simultaneous drip irrigation tubes with the emitters being spaced apart by about one foot on each length of tube.

The resulting process can be run at high speeds, and it is estimated that the production line can operate at six drippers per second, or 360 drippers per minute, with a spacing between drippers of about 12 inches.

The drip irrigation product and techniques of this invention meet the objectives of producing a low cost dripper that can be used for multiple crops and/or multiple growing seasons, while delivering precise amounts of water at each orifice, and also while being resistant to clogging by impurities in the water. The film extrusion technique can use the same linear low density grades of resins used for heavy duty polyethylene bags. These resins are manufactured in very large quantities and sold at reasonably low prices. Although this is the preferred resin, any polyolefin or combination of polyolefins may be used.

Although the present invention has been described with respect to laminating the dripper units in series to the exterior of a plastic film bubble which has been bi-axially oriented by extrusion and film blowing techniques, the invention also may be carried out by bonding the dripper units in series to the exterior of a single layer extruded sheet, followed by forming the extruded sheet into the tubular form with the bonded drippers on the inside of the sealed tube. In this instance, the dripper units are carried to the area of the nip of the pressure rollers by an endless belt conveyor which inserts the dripper units onto the extruded film in advance of passing between the pressure rolls. The labyrinthine face of each dripper unit is heat bonded to the exterior of the extruded film sheet in the manner described previously. The exit holes are then punched followed by forming the sealed conduit also as described previously.

What is claimed is:

1. A process for making drip irrigation lines comprising:

providing a molded drip emitter having an emitter body with an elongated pressure-reducing channel extending through the emitter body, extruding a plastic film through an extruder die with an air feed tube at an air injection end of a plastic film bubble formed from the extruded film to produce a bi-axially oriented plastic film bubble in which the wall of the bubble is oriented lengthwise by the initial extrusion of the sheet followed by lateral orientation caused by the pressure exerted outwardly within the bubble, providing a pair of pressure rolls at a downstream end of the extruded plastic film bubble remote from an air injection end of the bubble and feeding the opposite side walls of the plastic film bubble to the nip of the pressure rolls for applying pressure to opposite wall portions of the plastic film bubble to form a unitary bi-axially oriented extruded film sheet, placing a series of said molded drip emitters on a high speed conveyor external to said extruded film sheet and feeding the molded drip emitters separately and independently to the nip of the pressure rolls from the high speed conveyor, inserting a sequence of the drip emitters from said high speed conveyor to the nip of the pressure rolls and in contact with an exterior wall of the extruded film sheet for bonding the emitter units in sequence to the exterior wall of the extruded plastic film sheet, using the pressure applied at the nip of the pressure rollers for exerting pressure on the emitters and using the heat of the film extrusion step for heat bonding the pressurized emitter units to the exterior of the resulting bi-axially oriented unitary extruded plastic film sheet structure, and forming the bi-axially oriented unitary extruded plastic film sheet, on the downstream side of the pressure rolls, into a sealed tube with the emitter units spaced apart along the resulting tube.

2. The method according to claim 1 in which the film is wrapped and sealed so the emitters are on the inside of the tube, and including forming an exit hole in the wall of the unitary plastic film sheet leading to the interior pressure-reducing passage of each bonded emitter unit.

3. The method according to claim 1 including forming an extrusion bead seal along the opposite marginal edges of the unitary extruded plastic film sheet downstream from the pressure rolls to form the tubular drip irrigation conduit.

4. The process according to claim 1 in which each drip emitter includes one or more molded inlet passages so that the inlet passages receive water under pressure traveling in the conduit and pass it through the pressure-reducing passage to reduce its pressure and to discharge the water to the exterior of the conduit at a drip rate.

5. The process according to claim 4 in which the inlet passages filter water entering the emitter from the conduit.

6. The process according to claim 1 in which a plurality of emitter units are sequentially bonded to a single extruded film sheet simultaneously and in parallel to form multiple drip irrigation lines.

7. A process for making drip irrigation lines comprising:

providing a molded emitter body having a pressure-reducing passage extending through an inner surface of the emitter body, extruding a plastic material through an extruder die to form an extruded plastic film sheet that passes between a pair of pressure rolls downstream from the extruder die, the extruded film sheet having a first surface and a second surface, positioning the emitter units on a high speed transport device external to said extruded film sheet and inserting a sequence of the emitter units separately and independently from the high speed transport device into the nip of the pressure rolls and in contact with the first surface of the extruded plastic film sheet, and using the pressure of the pressure rolls and the heat of extrusion retained in the extruded plastic film sheet to apply pressure to the emitter units in sequence and heat-bond the inner surface of the emitter units to the first surface of the extruded plastic film sheet, bonding the outer marginal edges of the extruded film sheet to form an elongated continuous flexible tubular conduit in which the first surface of the extruded film sheet faces the interior of the conduit, in which the second surface of the extruded film sheet forms the exterior of the conduit and in which the emitters are thereby bonded to the interior of the conduit, and forming an exit hole in the plastic film sheet leading to the passage of each emitter unit on the tubular conduit so that water traveling in the interior of the conduit can pass through the pressure-reducing passage in the emitter and be discharged from the exterior of the conduit at a drip rate.

8. The process according to claim 7 in which the emitter units include one or more molded inlet passages leading to a labyrinthine passage.

9. The process according to claim 7 in which the extruded plastic film sheet is bi-axially oriented prior to bonding the emitter units to the sheet.

10. The process according to claim 7 in which a plurality of emitter units are sequentially bonded to a single extruded film sheet simultaneously and in parallel to form multiple drip irrigation lines.

11. The process according to claim 7 in which the transport device comprises a transport belt which wraps around one of the pressure rolls to transfer the dripper from the belt to the face of the extruded film.

12. The process according to claim 7 in which the transport device comprises an endless transport belt.

* * * * *